US009977278B2

(12) United States Patent
Kim et al.

(10) Patent No.: US 9,977,278 B2
(45) Date of Patent: May 22, 2018

(54) POLARIZING MEMBER AND DISPLAY DEVICE HAVING THE SAME

(71) Applicant: SAMSUNG DISPLAY CO., LTD., Yongin, Gyeonggi-Do (KR)

(72) Inventors: Min Su Kim, Gyeonggi-do (KR); Boo Kan Ki, Gyeonggi-do (KR); Beong Hun Beon, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 57 days.

(21) Appl. No.: 14/688,132

(22) Filed: Apr. 16, 2015

(65) Prior Publication Data

US 2016/0154272 A1 Jun. 2, 2016

(30) Foreign Application Priority Data

Dec. 2, 2014 (KR) ........................ 10-2014-0170483

(51) Int. Cl.

| | |
|---|---|
| ***G02F 1/1335*** | (2006.01) |
| ***G02B 5/02*** | (2006.01) |
| ***G02B 1/14*** | (2015.01) |
| ***G02B 27/28*** | (2006.01) |

(52) U.S. Cl.

CPC ......... *G02F 1/133502* (2013.01); *G02B 1/14* (2015.01); *G02B 5/0215* (2013.01); *G02B 5/0242* (2013.01); *G02B 5/0294* (2013.01); *G02B 27/286* (2013.01); *G02F 1/13362* (2013.01); *G02F 1/133504* (2013.01); *G02F 1/133528* (2013.01)

(58) Field of Classification Search

CPC ......... G02F 1/133502; G02F 1/133504; G02F 1/133528; G02F 1/13362

See application file for complete search history.

(56) References Cited

U.S. PATENT DOCUMENTS

| | | | | |
|---|---|---|---|---|
| 6,373,541 | B1 * | 4/2002 | Sekime | G02F 1/133634 349/113 |
| 2013/0242395 | A1 * | 9/2013 | Nishimura | G02B 5/0226 359/599 |
| 2013/0250413 | A1 | 9/2013 | Furui et al. | |

FOREIGN PATENT DOCUMENTS

| | | | |
|---|---|---|---|
| KR | 1020090020961 | 2/2009 | |
| KR | 1020100094469 | 8/2010 | |
| KR | 1020110069212 | 6/2011 | |
| KR | 1020140001209 | 1/2014 | |
| WO | 2009054287 | 4/2009 | |
| WO | WO 2011162184 A1 * | 12/2011 | G02B 5/0247 |

* cited by examiner

*Primary Examiner* — James Dudek

(74) *Attorney, Agent, or Firm* — F. Chau & Associates, LLC

(57) ABSTRACT

A polarizing member includes a base layer, a first reflection preventing layer and a second reflection preventing layer. A base layer polarizes light, generating polarized light. A first reflection preventing layer is disposed on the base layer, diffusing the polarized light and generating first diffused light. A second reflection is disposed on the first reflection preventing layer, diffusing the first diffused light and generating second diffused light.

17 Claims, 7 Drawing Sheets

100a 150a
120
140a
160
110
130
170

POLARIZING MEMBER AND DISPLAY DEVICE HAVING THE SAME

This application claims priority under 35 U.S.C. § 119 to Korean Patent Application No, 10-2014-0170483, filed on Dec. 2, 2014 in the Korean Intellectual Property Office, the disclosure of which is incorporated by reference herein in its entirety.

TECHNICAL FIELD

The present invention relates to a polarizing member and a display device having the same.

DESCRIPTION OF RELATED ART

Liquid crystal display (LCD) devices include an anti-glare (AG)-treated layer to reduce eye strain and fatigue that may be caused by surface reflections. The AG-treated layer may be formed of a reflection preventing layer containing silica particles to diffuse light. Accordingly, light reflected from a panel of the LCD devices may be prevented from being incident into the eyes of a user.

However, the reflection preventing layer may cause optical interference with the LCD panel to create a sparkle phenomenon, a distortion of an image. For example, if silica particles are located at the boundary between two adjacent pixels, refraction of light by the silica particles may distort an image displayed by the LCD devices.

SUMMARY

According to an exemplary embodiment of the present invention, a polarizing member includes a base layer, a first reflection preventing layer and a second reflection preventing layer. A base layer polarizes light, generating polarized light. A first reflection preventing layer is disposed on the base layer, diffusing the polarized light and generating first diffused light. A second reflection is disposed on the first reflection preventing layer, diffusing the first diffused light and generating second diffused light.

According to an exemplary embodiment of the present invention, a display device includes a backlight assembly, a display panel, a first polarizing member and a second polarizing member. A backlight assembly generates first light. A display panel emits second light, having a first surface and a second surface and generating an image through the first surface. A first polarizing member is disposed on the first surface of the display panel, polarizing the second light. A second polarizing member is disposed on the second surface of the display panel, polarizing the first light and generating the second light. The second polarizing member is formed of the polarizing member.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF EXEMPLARY EMBODIMENTS

Figure 1:
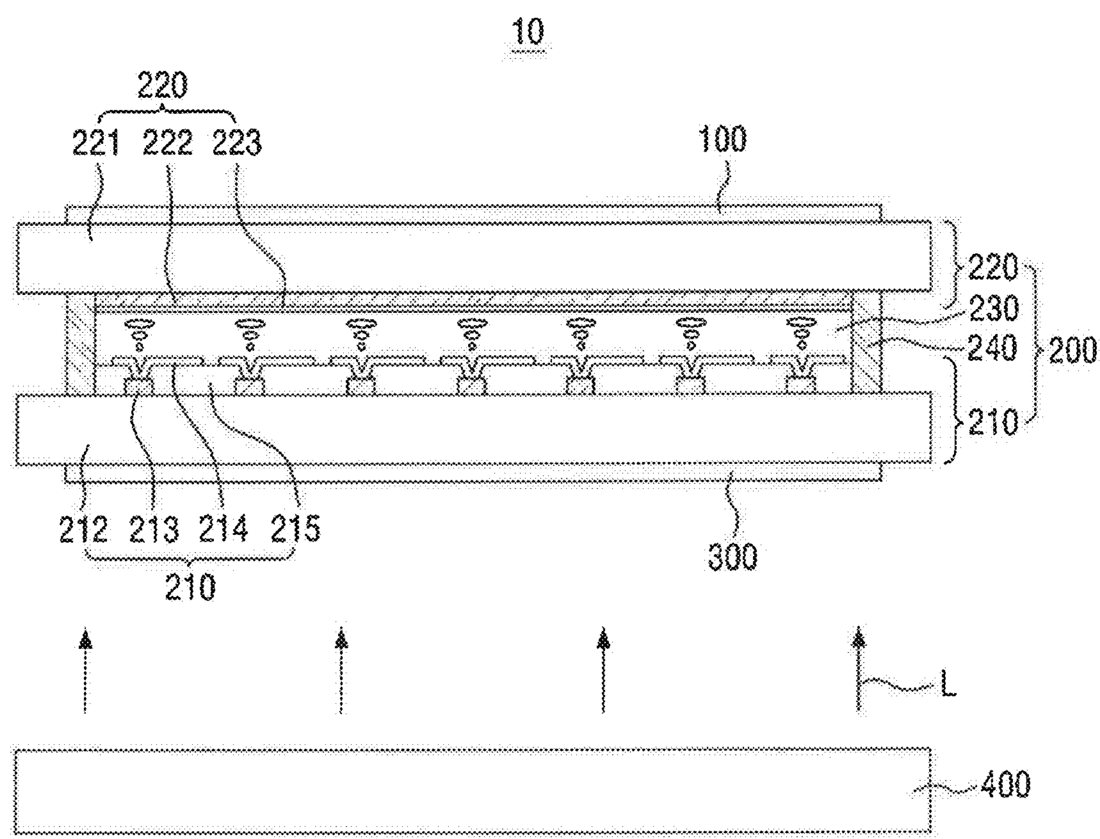
FIG. 1 is a cross-sectional view of a liquid crystal display (LCD) device according to an exemplary embodiment of the present invention.

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

For the convenience of description, it is assumed that a display device is a liquid crystal display (LCD) device, but the present invention is not limited thereto. For example, the present invention is also applicable to various other display devices such as an electrophoretic display device, an organic light-emitting display device, an inorganic electroluminescent display device, a field emission display (FED) device, a surface-conduction electron-emitter display device, a plasma display device, and a cathode ray tube display device.

FIG. 1 is a cross-sectional view of an LCD device according to an exemplary embodiment of the present invention.

Referring to FIG. 1, an LCD device 10 includes an LCD panel. 200, which has a first surface and a second surface and displays an image with the use of light, a first polarizing plate 100, which is disposed on the first surface of the LCD panel 200, a second polarizing plate 300, which is disposed on the second surface of the LCD panel 200, and a backlight assembly 400, which provides light to the LCD panel 200.

The LCD panel 200 includes an array substrate 210, an opposing substrate 220, which faces, and is coupled to, the array substrate 210, a liquid crystal layer 230, which is interposed between the array substrate 210 and the opposing substrate 220, and a sealant 240, which couples the array substrate 210 and the opposing substrate 220 together.

The array substrate 210 includes a first base substrate 212 including a plurality of pixel regions, a plurality of thin-film transistors 213 formed in the pixel regions, respectively, a plurality of pixel electrodes 214 formed in the pixel regions, respectively, and electrically connected to the TFTs 213, and an insulating layer 215 formed on the first base substrate 212 and covers the TFTs 213.

The opposing substrate 220 is disposed above the array substrate 210. The opposing substrate 220 includes a second base substrate 221, a color filter layer 222, which is disposed on the bottom of the second base substrate 212 and realizes predetermined colors with the use of light, and a common electrode 223, which is formed on the color filter layer 222 and outputs a common voltage. The liquid crystal layer 230 may adjust the transmittance of light L provided by the backlight assembly 400 according to an electric field formed between the pixel electrodes 214 and the common electrode 223.

The second polarizing plate 300 is disposed between the LCD panel 200 and the backlight assembly 400. The second polarizing plate 300 may polarize the light L, which is emitted from the backlight assembly 400, and may provide the polarized light to the LCD panel 200.

The first polarizing plate 100 may polarize and emit light emitted from the LCD panel 200 in a direction perpendicular to a direction in which the second polarizing plate 300 polarizes light. The structure of the first polarizing plate 100 will hereinafter be described.

Figure 2:
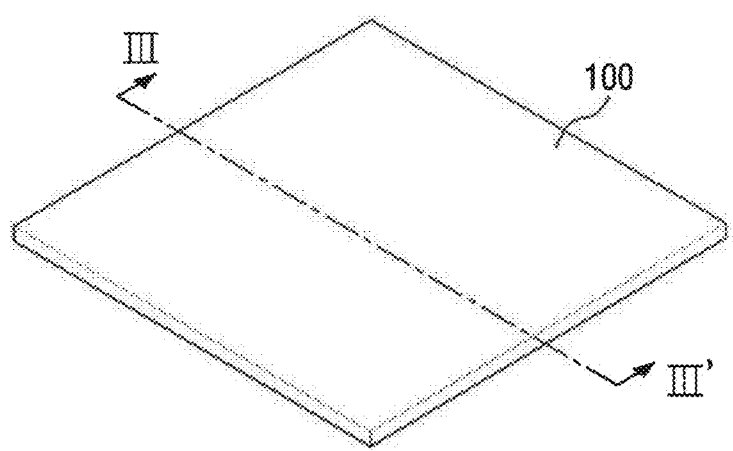
FIG. 2 is a perspective view of a first polarizing plate of the LCD device of FIG. 1 according to an exemplary embodiment of the present invention.
Figure 3:
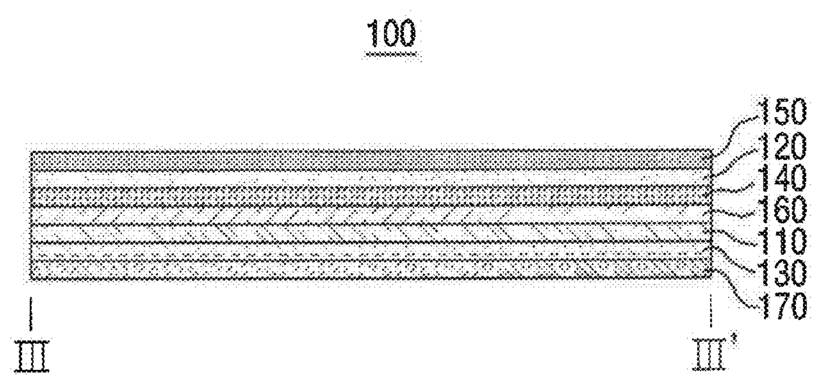
FIG. 3 is a cross-sectional view taken along line III-III' of FIG. 2 according to an exemplary embodiment of the present invention.

FIG. 2 is a perspective view of the first polarizing plate of the LCD device 10 of FIG. 1, and FIG. 3 is a cross-sectional view taken along line III-III' of FIG. 2.

Referring to FIGS. 2 and 3, the first polarizing plate 100 of the LCD device 10 may be a rectangular optical sheet, but the present invention is not limited thereto.

The first polarizing plate 100 includes a base layer 110, a first protective layer 120, a second protective layer 130, a first reflection preventing layer 140, a second reflection preventing layer 150, a first adhesive layer 160 and a second adhesive layer 170.

The base layer 110 has a transmission axis for transmitting light therethrough. The base layer 110 may polarize linearly light incident thereupon from the outside in a direction of the transmission axis. The base layer 110 may be a polyvinyl alcohol (PVA)-based film with a dichroic dye absorbed and oriented therein, but the invention is not limited thereto. The base layer 110 may have a thickness of about 5 μm to about 40 μm.

The first protective layer 120 and the second protective layer 130 may serve to protect the base layer 110. The first protective layer 120 has a first surface and a second surface, and is disposed above the base layer 110 to face the base layer 110. The second protective layer 130 is disposed below the base layer 110. The first protective layer 120 and the second protective layer 130 may be formed of a material with non-optical properties, so the protective layers 120 and 130 do not change a polarization state of light polarized by the base layer 110.

For example, the first protective layer 120 and the second protective layer 130 include films containing a thermoplastic resin, for example, a polyester-based resin such as polyethylene terephthalate, polyethylene isophthalate, or polybutylene terephthalate, a cellulose-based resin such as diacetyl cellulose or triacetyl cellulose, a polycarbonate-based resin, an acrylic-based resin such as polymethyl methacrylate or polyethyl methacrylate, a styrene-based resin such as polystyrene or an acrylonitrile-styrene copolymer, polyethylene, polypropylene, a polyolefin resin with a cyclo or norbornene structure, a polyolefin-based resin such as an ethylene propylene copolymer, a vinyl chloride-based resin, nylon, a polyamide-based resin such as aromatic polyamide, an imide-based resin, a polyethersulfone-based resin, a sulfone-based resin, a polyether ketone-based resin, a polyphenylene sulfide-based resin, a vinyl alcohol-based resin, a vinylidene chloride-based resin, a vinyl butyral-based resin, an allyl acrylate-based resin, a polyoxymethylene-based resin, or an epoxy-based resin, or a blend of the thermoplastic resin. The first protective layer 120 and the second protective layer 130 may also include films containing a thermally curable resin such as a methacrylic-based resin, a urethane-based resin, an epoxy-based resin or a silicon-based resin, or a ultraviolet (UV) curable resin.

The first protective layer 120 and the second protective layer 130 may have a thickness of about 1 μm to about 500 μm.

The second protective layer 130 may be formed of a film having a phase compensation function. For example, the second protective layer 130 may include a functional film such as a phase compensation film in the upper portion of the second protective layer 130.

The first reflection preventing layer 140, which primarily diffuses light emitted from the base layer 110, is disposed on the first surface of the first protective layer 120 that faces the base layer 110. For example, the first reflective preventing layer 140 is disposed on the bottom surface of the first protective layer 120 above the base layer 110, as illustrated in FIG. 3. Even though not specifically illustrated in FIG. 3, the first reflection preventing layer 140 may be formed of a reflection preventing composition to have, for example, surface irregularities, or may be formed of a binder layer having a binder and a plurality of beads scattered in the binder to diffuse light.

The second reflection preventing layer 150, which secondarily diffuses the light emitted from the base layer 110, is disposed on the second surface of the first protective layer 120. For example, the second reflection preventing layer 150 is disposed on the top surface of the first protective layer 120, as illustrated in FIG. 3. The second reflection preventing layer 150 is an outer surface of the display device 10, but the present invention is not limited thereto. Even though not specifically illustrated in FIG. 3, the second reflection preventing layer 150 may be formed of a reflection preventing composition to have, for example, surface irregularities, or may be formed of a binder layer having a binder and a plurality of beads scattered in the binder to diffuse light.

The first reflection preventing layer 140 and the second reflection preventing layer 150 are in contact with, or attached onto, the top and the bottom, respectively, of the first protective film 120, but the present invention is not limited thereto.

In the display device 10, light emitted from the base layer 110 is diffused first by the first reflection preventing layer 140 and then by the second reflection preventing layer 150. Since the light emitted from the base layer 110 is diffused twice, the occurrence of a sparkle phenomenon, i.e., a distortion of an image caused by optical interference, may be prevented.

The structures of the first reflection preventing layer 140 and the second reflection preventing layer 150 will hereinafter be described.

The first adhesive layer 160 is attached onto the top surface of the base layer 110, and may fix the first protective layer 120, which is disposed between the first reflection preventing layer 140 and the second reflection preventing layer 150, to the base layer 110.

The first adhesive layer 160 may have a different refractive index from the first reflection preventing layer 140. For example, the refractive index of the first adhesive layer 160 is smaller than the refractive index of the first reflection preventing layer 140. Due to the difference in the refractive indexes of the first adhesive layer 160 and the first reflection preventing layer 140, an optical path difference is generated upon the primary diffusion of light emitted from the base layer 110, and as a result, the occurrence of a sparkle phenomenon, which is a distortion of an image caused by optical interference, may be effectively prevented.

The second adhesive layer 170 is attached onto the top surface of the second base substrate 221, and may fix the first polarizing plate 100 to the LCD panel 200. Even though not specifically illustrated in FIG. 1, an adhesive layer may be provided in the second polarizing plate 300, and may thus attach the second polarizing plate onto the first base substrate 212.

The structures of the first reflection preventing layer 140 and the second reflection preventing layer 150 will hereinafter be described.

Each of the first reflection preventing layer 140 and the second reflection preventing layer 150 is configured to have surface irregularities. The surface irregularities may be of an embossed type or an engraved type. Surface irregularities of the embossed type may be patterns that protrude from a surface, and surface irregularities of the engraved type may be patterns that are recessed from a surface. The patterns may be regular, but the present invention is not limited thereto.

Figure 4:
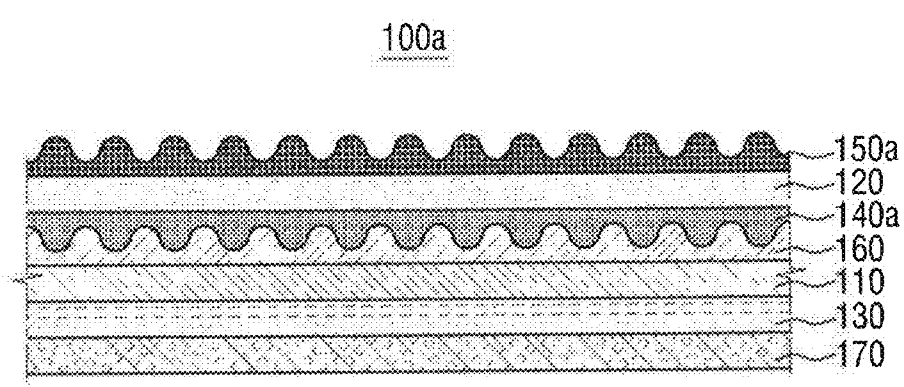
FIG. 4 is a partial enlarged cross-sectional view, taken along line III-III' of FIG. 2, of a display device according to an exemplary embodiment of the present invention.

FIG. 4 is a partial enlarged cross-sectional view, taken long line III-III' of FIG. 2, of a first polarizing plate of a display device according to an exemplary embodiment of the present invention.

Referring to FIG. 4, a first polarizing plate 100*a* includes a first reflection preventing layer 140*a*, which is disposed on the bottom of a first protective layer 120, and a second reflection preventing layer 150*a*, which is disposed on the top of the first protective layer 120.

The first reflection preventing layer 140*a* may have surface irregularities. For example, the first reflection preventing layer 140*a* has an embossed or corrugated surface. The second reflection preventing layer 150*a* may also have surface irregularities. For example, the second reflection preventing layer 150*a* has an embossed or corrugated surface.

The surface irregularities on the first reflection preventing layer 140*a* and/or the second reflection preventing layer 150*a* may have a uniform size, but the present invention is not limited thereto. The surface irregularities on the first reflection preventing layer 140*a* and/or the second reflection preventing layer 150*a* may be formed as semicircular or hemispherical protrusions, but the present invention is not limited thereto.

A first adhesive layer 160 may have surface irregularities of the engraved type to be properly coupled to the first reflection preventing layer 140*a*, which have surface irregularities of the embossed type.

A base layer 110, the first protective layer 120, a second protective layer 130, and a second adhesive layer 170 of FIG. 4 are substantially identical to their respective counterparts of FIG. 3, and thus, detailed descriptions thereof will be omitted.

Figure 5:
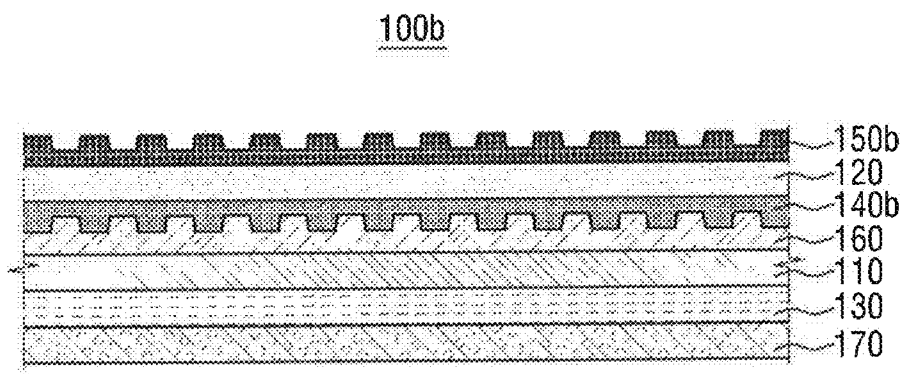
FIG. 5 is a partial enlarged cross-sectional view, taken along line III-III' of FIG. 2, of a display device according to an exemplary embodiment of the present invention.

FIG. 5 is a partial enlarged cross-sectional view, taken long line III-III' of FIG. 2, of a first polarizing plate of a display device according to an exemplary embodiment of the present invention.

A first polarizing plate 100*b* of FIG. 5 is substantially the same as the first polarizing plate 100*a* of FIG. 4 except for the structures of a first reflection preventing layer 140*b*, a second reflection preventing layer 150*b* and a first adhesive layer 160, and thus will hereinafter be described, focusing mainly on the first reflection preventing layer 140*b*, the second reflection preventing layer 150*b* and the first adhesive layer 160.

Referring to FIG. 5, the first reflection preventing layer 140*b* may have surface irregularities of the engraved type, and the second reflection preventing layer 150*b* may also have surface irregularities of the engraved type.

The surface irregularities on the first reflection preventing layer 140*b* and/or the second reflection preventing layer 150*b* may have a uniform size, but the present invention is not limited thereto. The surface irregularities on the first reflection preventing layer 140*b* and/or the second reflection preventing layer 150*b* may be formed as angular recesses with a predetermined depth, but the present invention is not limited thereto.

The first adhesive layer 160 may have surface irregularities of the embossed type to be properly coupled to the first reflection preventing layer 140*b*, which have surface irregularities of the engraved type.

Figure 6:
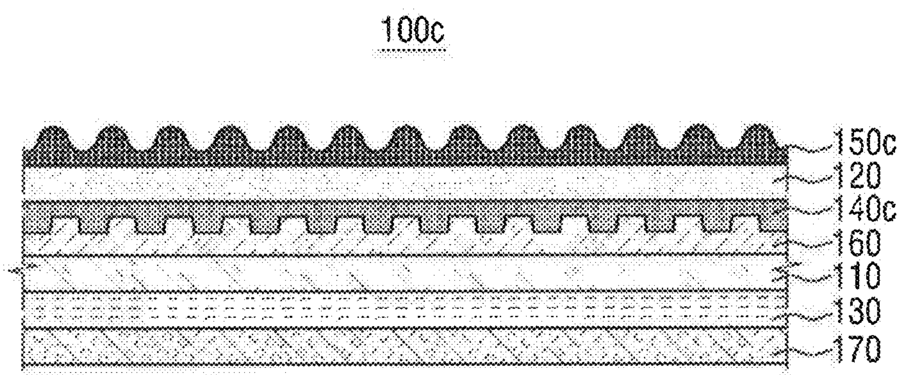
FIGS. 6 to 13 are partial enlarged cross-sectional views, taken along line III-III' of FIG. 2, of a display device according to an exemplary embodiment of the present invention.
Figure 7:
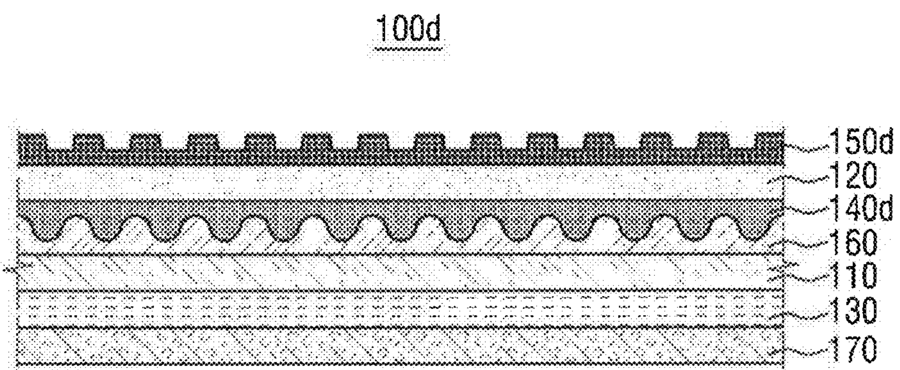

FIGS. 6 and 7 are partial enlarged cross-sectional view, taken long line III-III' of FIG. 2, of first polarizing plates of display devices according to exemplary embodiments of the present invention.

A first polarizing plate 100*c* of FIG. 6 is substantially the same as the first polarizing plate 100*a* of FIG. 4 except for the structure of a first reflection preventing layer 140*c*, and thus hereinafter be described, focusing mainly on the first reflection preventing layer 140*c*.

Referring to FIG. 6, the first reflection preventing layer 140*c* has surface irregularities of the engraved type, and the second reflection preventing layer 150*c* has surface irregularities of the embossed type.

A first adhesive layer 160 has surface irregularities of the embossed type to be properly coupled to the first reflection preventing layer 140*c*, which has surface irregularities of the engraved type.

A first polarizing plate 100*d* of FIG. 7 is substantially the same as the first polarizing plate 100*a* of FIG. 4 except for the structure of a second reflection preventing layer 150*d*, and thus will hereinafter be described, focusing mainly on the second reflection preventing layer 150*d*.

Referring to FIG. 7, the second reflection preventing layer 150*d* has surface irregularities of the engraved type, and a first reflection preventing layer 140*d* has surface irregularities of the embossed type.

Each of the first reflection preventing layer 140 and the second reflection preventing layer 150 may have surface irregularities of the embossed type or the engraved type, as described above with reference to FIGS. 4 to 7, but the invention is not limited thereto. For example, each of the first reflection preventing layer 140 and the second reflection preventing layer 150 may be formed of a binder and a plurality of beads scattered in the binder to diffuse light.

Figure 8:
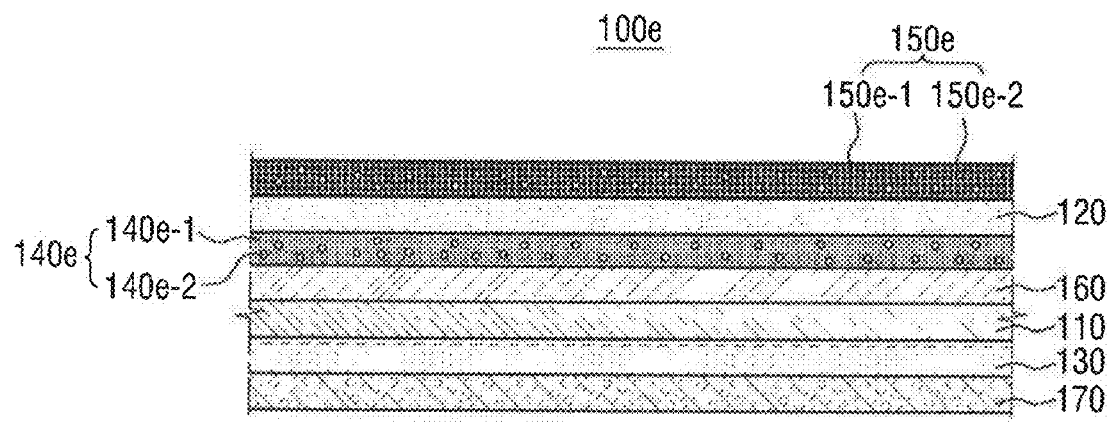

FIG. 8 is a partial enlarged cross-sectional view, taken long line III-III' of FIG. 2, of a first polarizing plate of a display device according to an exemplary embodiment of the present invention.

A first polarizing plate 100*e* of FIG. 8 is substantially the same as the first polarizing plate 100*a* of FIG. 4 except for the structures of a first reflection preventing layer 140*e* and a second reflection preventing layer 150*e*, and thus will hereinafter be described, focusing mainly on the first reflection preventing layer 140*e* and the second reflection preventing layer 150*e*.

Referring to FIG. 8, the first reflection preventing layer 140*e* is disposed on the bottom of a first protective layer 120 and is formed of a binder 140*e*-1 and a plurality of beads 140*e*-2 scattered in the binder 140*e*-1 to diffuse light. The beads 140*e*-2 may have a uniform size and have the same refractive index, but the present invention is not limited thereto. Each of the beads 140*e*-2 may have a different refractive index from the binder 140*e*-1.

The second reflection preventing layer 150*e* is disposed at the top of the first protective layer 120, and is formed of a binder 150*e*-1 and a plurality of beads 150*e*-2 scattered in the binder 150*e*-1 to diffuse light. The heads 150*e*-2 may have a uniform size and have the same refractive index, but the invention is not limited thereto. Each of the heads 150*e*-2 may have a different refractive index from the binder 150*e*-1.

In the first polarizing plate 100*e*, light emitted from a base layer 110 is diffused first by the beads 140*e*-2 included in the first reflection preventing layer 140*e* and then by the beads 150*e*-2 included in the second reflection preventing layer 150*e*. Since the light emitted from the base layer 110 is diffused twice, the occurrence of a sparkle phenomenon, which is a distortion of an image caused by optical interference, may be prevented.

Since the first reflection preventing layer 140*e* is formed in a flat shape, a first adhesive layer 160 may also be formed in a flat shape to be properly coupled to the first reflection preventing layer 140*e*.

Each of the first reflection preventing layer 140*e* and the second reflection preventing layer 150*e* is formed of a binder layer including a binder and a plurality of beads scattered in the binder to diffuse light, as described above with reference to FIG. 8, but the present invention is not limited thereto. For example, one of the first reflection preventing layer 140 and the second reflection preventing layer 150 may have surface irregularities of the embossed type or the engraved type, and the other reflection preventing layer may be formed of a binder layer including a binder and a plurality of beads scattered in the binder to diffuse light.

Figure 9:
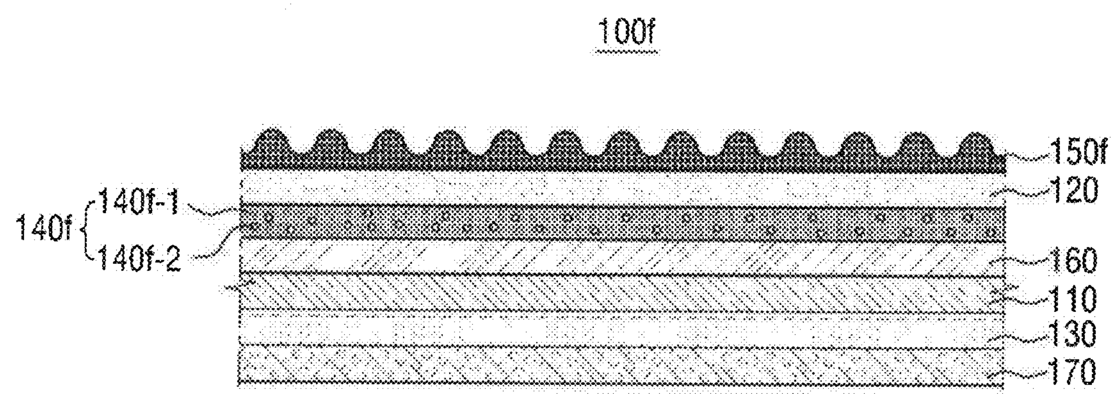
Figure 10:
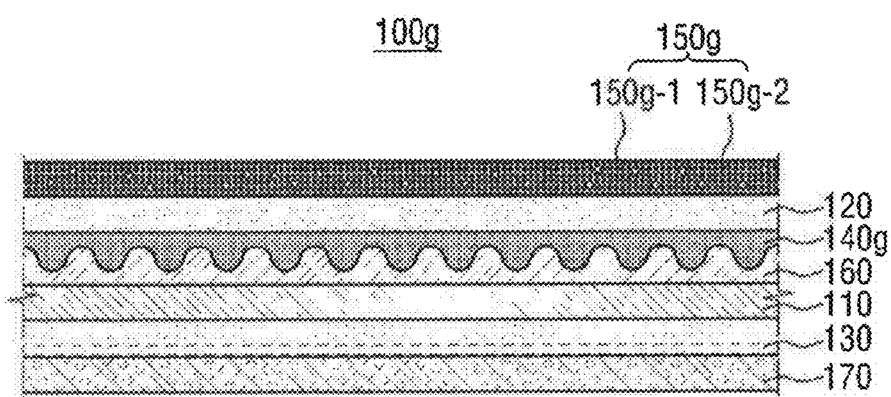

FIGS. 9 and 10 are partial enlarged cross-sectional view, taken long line III-III' of FIG. 2, of first polarizing plates of display devices according to exemplary embodiments of the present invention.

A first polarizing plate 100*f* of FIG. 9 is substantially the same as the first polarizing plate 100*e* of FIG. 8 except for the structure of a second reflection preventing layer 150*f*, and thus will hereinafter be described, focusing mainly on the second reflection preventing layer 150*f*.

Referring to FIG. 9, the first polarizing plate 100*f* includes the second reflection preventing layer 150*f*, which is disposed on the top of a first protective layer 120 and has surface irregularities of the embossed type. A first reflection preventing layer 140*f* is disposed on the bottom of the first protective layer 120 and includes a binder 140*f*-1 and a plurality of beads 140*f*-2 scattered in the binder 140*f*-1 to diffuse light.

The second reflection preventing layer 150*f* is illustrated in FIG. 9 as having surface irregularities of the embossed type, but the present invention is not limited thereto. For example, the second reflection preventing layer 150*f* has surface irregularities of the engraved type.

A first polarizing plate 100*g* of FIG. 10 is substantially the same as the first polarizing plate 100*e* of FIG. 8 except for the structure of a first reflection preventing layer 140*g*, and thus will hereinafter be described, focusing mainly on the first reflection preventing layer 140*g*.

Referring to FIG. 10, the first polarizing plate 100*g* includes the first reflection preventing layer 140*g*, which is disposed on the bottom of a first protective layer 120 and has surface irregularities of the embossed type. A second reflection preventing layer 150*g* is disposed on the top of the first protective layer 120 and includes a binder 150*g*-4 and a plurality of beads 150*g*-2 scattered in the binder 150*g*-1 to diffuse light.

The first reflection preventing layer 140*g* is illustrated in FIG. 10 as having surface irregularities of the embossed type, but the present invention is not limited thereto. For example, the first reflection preventing layer 140*g* has surface irregularities of the engraved type.

In an exemplary embodiment, at least one of a first reflection preventing layer and a second reflection preventing layer may be formed of a binder layer including a binder and a plurality of beads scattered in the binder to diffuse light, as described above with reference to FIGS. 8 to 10, but the invention is not limited thereto. For example, at least one of a first reflection preventing layer and a second reflection preventing layer may be formed of a binder layer with surface irregularities.

Figure 11:
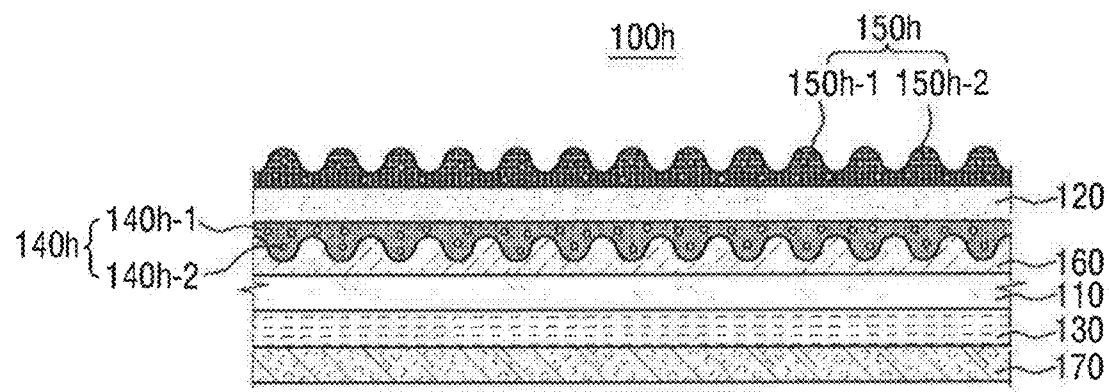

FIG. 11 is a partial enlarged cross-sectional view, taken long line III-III' of FIG. 2, of a first polarizing plate of a display device according to an exemplary embodiment of the present invention.

A first polarizing plate 100*h* of FIG. 11 is substantially the same as the first polarizing plate 100*e* of FIG. 8 except for the structures of a first reflection preventing layer 140*h* and a second reflection preventing layer 150*h*, and thus will hereinafter be described, focusing mainly on the first reflection preventing layer 140*h* and the second reflection preventing layer 150*h*.

Referring to FIG. 11, the first reflection preventing layer 140*h* is disposed on the bottom of a first protective layer 120 and is formed of a binder 140*h*-1 and a plurality of beads 140*h*-2 scattered in the binder 140*h*-1 to diffuse light. The first reflection preventing layer 140*h* has surface irregularities.

The second reflection preventing layer 150*h* is disposed on the top of the first protective layer 120 and is formed of a binder 150*h*-1 and a plurality of beads 150*h*-2 scattered in the binder 150*h*-1 to diffuse light. The second reflection preventing layer 150*h* has surface irregularities.

Each of the first reflection preventing layer 140*h* and the second reflection preventing layer 150*h* has surface irregularities of the embossed type, but the present invention is not limited thereto. For example, each of the first reflection preventing layer 140*h* and the second reflection preventing layer 150*h* may have surface irregularities of the engraved type.

Since the first reflection preventing layer 140*h* has surface irregularities, a first adhesive layer 160 also has surface irregularities to be properly coupled to the first reflection preventing layer 140*h*.

Each of the first reflection preventing layer 140*h* and the second reflection preventing layer 150*h* of FIG. 11 is formed of a binder layer with surface irregularities, but the present invention is not limited thereto. For example, one of the first reflection preventing layer 140*h* and the second reflection preventing layer 150*h* may be formed of a binder layer with surface irregularities, and the other reflection preventing layer may have surface irregularities of the embossed type or the engraved type.

Figure 12:
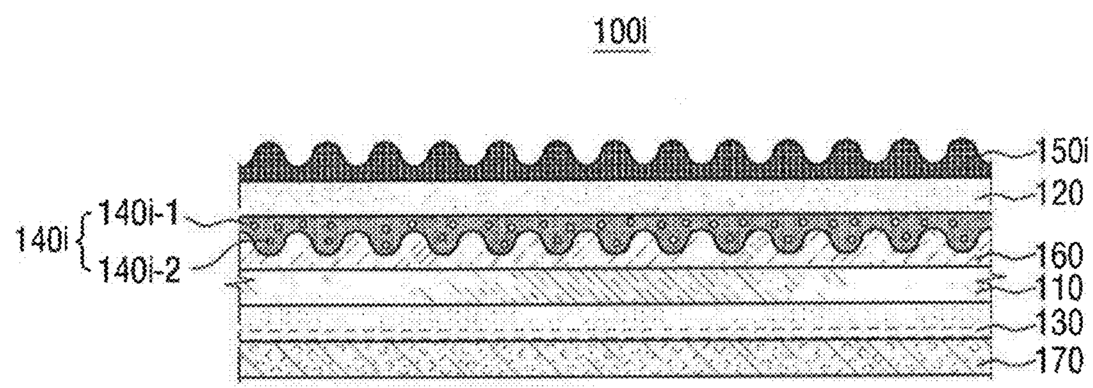

FIG. 12 is a partial enlarged cross-sectional view, taken long line III-III' of FIG. 2, of a first polarizing plate of a display device according to another exemplary embodiment of the invention.

A first polarizing plate 100*i* of FIG. 12 is substantially the same as the first polarizing plate 100*h* of FIG. 11 except for the structure of a second reflection preventing layer 150*i*, and thus will hereinafter be described, focusing mainly on the first reflection preventing layer 150*i*.

Referring to FIG. 12, the second reflection preventing layer 150*i* is disposed on the top of a first protective layer 120 and has surface irregularities of the embossed type. Alternatively, the second reflection preventing layer 150*i* may have surface irregularities of the engraved type.

A first reflection preventing layer 140*i* is disposed on the bottom of the first protective layer 120, and is formed of a binder 140*i*-1 and a plurality of beads 140*i*-2 scattered in the binder 140*i*-1 to diffuse light. The first reflection preventing layer 140*i* has surface irregularities.

In FIG. 12, the first reflection preventing layer 140*i* has surface irregularities, and the second reflection preventing layer 150*i* has a non-binder layer with surface irregularities. However, the present invention is not limited thereto. For example, the first reflection preventing layer 140*i* may be formed of a non-binder layer with surface irregularities, and the second reflection preventing layer 150*i* may be formed of a binder layer with surface irregularities.

In exemplary embodiments, one of a first reflection preventing layer and a second reflection preventing layer may be formed of a binder layer, and the other reflection preventing layer may be formed of a binder with surface irregularities.

Figure 13:
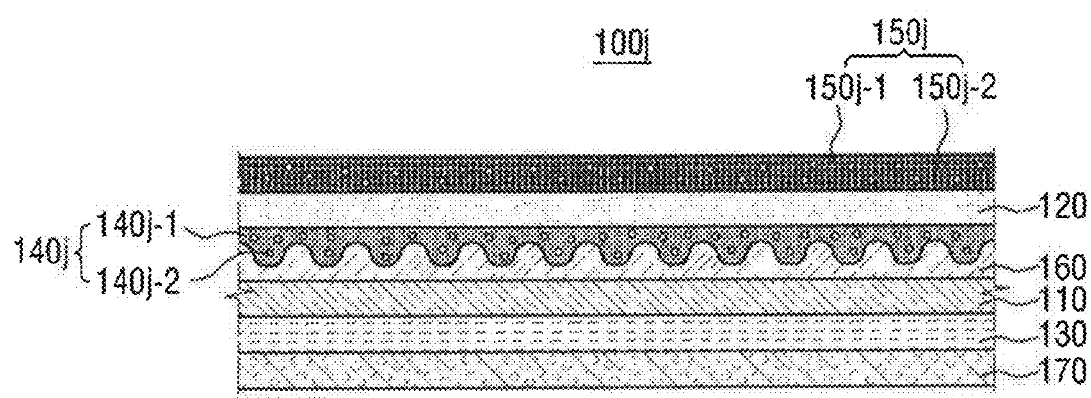

FIG. 13 is a partial enlarged cross-sectional view, taken long line III-III' of FIG. 2, of a first polarizing plate of a display device according to an exemplary embodiment of the present invention.

A first polarizing plate 100*j* of FIG. 13 is substantially the same as the first polarizing plate 100*i* of FIG. 12 except for the structure of a second reflection preventing layer 150*j*, and thus will hereinafter be described, focusing mainly on the second reflection preventing layer 150*j*.

Referring to FIG. 13, the second reflection preventing layer 150*j* is disposed on the top of a first protective layer 120, and may be formed of a binder 150*j*-1 and a plurality of beads 150*j*-2 scattered in the binder 150*j*-1 to diffuse light. The second reflection preventing layer 150*j* has a flat surface having no surface irregularities.

A first reflection preventing layer 140*j* is disposed on the bottom of the first protective layer 120, and may be formed of a binder 140*j*-1 and a plurality of beads 140*j*-2 scattered in the binder 140*j*-1 to diffuse light. The first reflection preventing layer 140*j* has surface irregularities.

While the present invention has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A polarizing member, comprising:

a base layer polarizing light and generating polarized light;

a protective layer configured to have a first surface and a second surface, the first surface facing the base layer, the second surface being an opposite surface of the first surface;

a first reflection preventing layer disposed on the first surface of the protective layer, diffusing the polarized light and generating first diffused light, wherein a surface of the first reflection preventing layer facing toward the base layer includes surface irregularities;

an adhesive layer interposed between the base layer and the first reflection preventing layer, attaching the base layer to the first reflection preventing layer; and a second reflection preventing layer disposed on the second surface of the protective layer, diffusing the first diffused light and generating second diffused light, wherein a surface of the second reflection preventing layer facing away from the base layer includes surface irregularities.

2. The polarizing member of claim 1, wherein the first reflection preventing layer includes an upper surface facing the first surface of the protective layer and a lower surface facing the base layer, and wherein the lower surface of the first reflection preventing layer includes surface irregularities of an embossed type.

3. The polarizing member of claim 1, wherein at least one of the first reflection preventing layer and the second reflection preventing layer includes a binder and a plurality of beads scattered in the binder to diffuse the polarized light or the first diffused light.

4. The polarizing member of claim 1, wherein one of the first reflection preventing layer and the second reflection preventing layer includes a binder and a plurality of beads scattered in the binder to diffuse the polarized light or the first diffused light and the other reflection preventing layer has surface irregularities.

5. The polarizing member of claim 1, wherein at least one of the first reflection preventing layer and the second reflection preventing layer includes a binder with surface irregularities and a plurality of beads scattered in the hinder to diffuse the polarized light or the first diffused light.

6. The polarizing member of claim 1, wherein one of the first reflection preventing layer and the second reflection preventing layer includes a binder with surface irregularities and a plurality of beads scattered in the binder to diffuse the polarized light or the first diffused light and the other reflection preventing layer has surface irregularities.

7. The polarizing member of claim 1, wherein one of the first reflection preventing layer and the second reflection preventing layer includes a binder with surface irregularities and a plurality of beads scattered in the binder to diffuse the polarized light or the first diffused light and the other reflection preventing layer includes a binder and a plurality of beads scattered in the binder to diffuse the polarized light or the first diffused light.

8. The polarizing member of claim 1, wherein the protective layer is interposed between the first reflection preventing layer and the second reflection preventing layer, wherein an upper surface of the adhesive layer is in direct contact with the first reflection preventing layer, and wherein a lower surface of the adhesive layer is in direct contact with the base layer.

9. The polarizing member of claim 8, wherein a refractive index of the adhesive layer is smaller than a refractive index of the first reflection preventing layer.

10. A display device, comprising:

a backlight assembly configured to generate first light;

a display panel configured to emit second light, wherein the display panel has a first surface and a second surface and generates an image through the first surface;

a first polarizing member disposed on the first surface of the display panel and configured to polarize the second light; and a second polarizing member disposed on the second surface of the display panel and configured to polarize the first light and generate the second light, wherein the first polarizing member includes:

a base layer polarizing the second light and generating polarized light;

a protective layer configured to have a first surface and a second surface, the first surface facing the base layer, the second surface being an opposite surface of the first surface;

a first reflection preventing layer disposed on the first surface of the protective layer, wherein the first reflection preventing layer diffuses the polarized light and generating first diffused light, and wherein a surface of the first reflection preventing layer facing toward the base layer includes surface irregularities having an embossed pattern or an engraved pattern;

an adhesive layer interposed between the base layer and the first reflection preventing layer, attaching the base layer to the first reflection preventing layer, wherein a refractive index of the adhesive layer is smaller than a refractive index of the first reflection preventing layer; and a second reflection preventing layer disposed on the second surface of the protective layer, wherein the second reflection preventing layer diffuses the first diffused light and generating second diffused light, wherein a surface of the second reflection preventing layer facing away from the base layer includes surface irregularities having an embossed pattern or an engraved pattern.

11. The display device of claim 10, wherein the first reflection preventing layer includes an upper surface facing the first surface of the protective layer and a lower surface facing the base layer, and wherein the lower surface of the first reflection preventing layer includes surface irregularities of an embossed type.

12. The display device of claim 10, wherein at least one of the first reflection preventing layer and the second reflection preventing layer includes a binder and a plurality of beads scattered in the binder to diffuse the polarized light or the first diffused light.

13. The display device of claim 10, wherein one of the first reflection preventing layer and the second reflection preventing layer includes a binder and a plurality of beads scattered in the binder to diffuse the polarized light or the first diffused light and the other reflection preventing layer has surface irregularities.

14. The display device of claim 10, wherein at least one of the first reflection preventing layer and the second reflection preventing layer includes a binder with surface irregularities and a plurality of beads scattered in the binder to diffuse the polarized light or the first diffused light.

15. The display device of claim 10, wherein one of the first reflection preventing layer and the second reflection preventing layer includes a binder with surface irregularities and a plurality of beads scattered in the binder to diffuse the polarized light or the first diffused light and the other reflection preventing layer has surface irregularities.

16. The display device of claim 10, wherein one of the first reflection preventing layer and the second reflection preventing layer includes a binder with surface irregularities and a plurality of beads scattered in the binder to diffuse the polarized light or the first diffused light and the other reflection preventing layer includes a binder and a plurality of beads scattered in the binder to diffuse the polarized light or the first diffused light.

17. The display device of claim 10, wherein the protective layer is interposed between the first reflection preventing layer and the second reflection preventing layer, wherein an upper surface of the adhesive layer is in direct contact with the first reflection preventing layer, and wherein a lower surface of the adhesive layer is in direct contact with the base layer.

* * * * *